United States Patent [19]

Lin

[11] Patent Number: 5,508,052

[45] Date of Patent: *Apr. 16, 1996

[54] METHOD OF PEELING AND SEGMENTING FRUITS

[75] Inventor: Thomas Lin, Los Angeles, Calif.

[73] Assignee: Classic Fresh Cuts, Inc., Tampa, Fla.

[ * ] Notice: The term of this patent shall not extend beyond the expiration date of Pat. No. 5,199,350.

[21] Appl. No.: 278,652

[22] Filed: Jul. 21, 1994

Related U.S. Application Data

[63] Continuation of Ser. No. 30,986, Mar. 12, 1993, abandoned, which is a continuation of Ser. No. 809,760, Dec. 18, 1991, Pat. No. 5,199,350, which is a division of Ser. No. 515,411, Apr. 27, 1990, Pat. No. 5,101,718.

[51] Int. Cl.$^6$ .................................................. A23P 1/00
[52] U.S. Cl. .................................................. 426/481; 426/518
[58] Field of Search .................................................. 426/481, 482, 426/518; 99/543, 564, 584, 590, 592, 593

[56] References Cited

U.S. PATENT DOCUMENTS 471,158  3/1892  Westerman .................................. 99/545
1,674,606  6/1928  Moscrip ...................................... 99/564

OTHER PUBLICATIONS

Sunkist Fresh Fruit Sectionizer Price List, Apr. 1980.
Lincoln Foodservice Products, Inc. Price Schedule, Dec. 1990.

*Primary Examiner*—George Yeung
*Attorney, Agent, or Firm*—Holland & Knight

[57] ABSTRACT

A method of peeling and segmenting a fruit which has an interior portion and a peel about the interior portion comprises forcing the fruit through a cutting assembly. While passing through the cutting assembly, the fruit is separated into at least two portions, each completely severed from the other. Additionally, each separated portion is also partially severed through the interior portion. The separated portions of the fruit are placed in contact with a scooping device which is then rotated so that the interior portion of the fruit is scooped out and separated from the peel. The portions so scooped out are comprised of two or more segments each in which is substantially separate from the remaining segments.

3 Claims, 7 Drawing Sheets

METHOD OF PEELING AND SEGMENTING FRUITS

This is a continuation of application Ser. No. 08/030,986, filed Mar. 12, 1993, now abandoned, which is a continuation of application Ser. No. 07/809,760, filed Dec. 18, 1991, now U.S. Pat. No. 5,199,350 which is a divisional of application Ser. No. 07/515,411 filed on Apr. 27, 1990, now U.S. Pat. No. 5,101,718.

FIELD AND BACKGROUND OF THE INVENTION

This invention relates to cutting devices and systems, and particularly cutting systems for cutting and segmenting fruit. The invention has particular application to fruit having a skin, wherein segments of the fruit without the skin are required.

In the food industry, there is a considerable need for prepared fruit dishes comprising, for example, oranges and grapefruit, which have been peeled and cut into a number of segments. The peeling and segmenting of fruit such as oranges and grapefruit is labor intensive in that it requires a considerable amount of time to peel an orange, remove the undesirable center core, and thereafter segment the remainder of the orange. Preparing of an orange and cutting it into segments in this way is a multi-step operation, and a relatively long period of time is required to peel and cut the fruit in this way.

It is therefore of benefit and advantage to this particular industry to have a device which efficiently mechanically removes the skin from fruit, and cuts it into segments with minimal loss of the fruit itself, at the same time maintaining a high output of the final product.

SUMMARY OF THE INVENTION

According to one aspect of the invention, there is provided a cutting device for cutting an object, the device comprising a cutting assembly; an outer casing about the cutting assembly, the casing having a sidewall, a first end, a second end, and a substantially central axis extending between the first and second ends, the first and second ends being open whereby the object to be cut enters the casing at the first end in an uncut condition, passes over the cutting assembly and exits the casing through the second end; the cutting assembly comprising a first cutting member extending within the sidewall of the outer casing, the first cutting member cutting the object in a manner so as to completely sever one portion of the object from another; the cutting assembly further comprising a second cutting member extending within the sidewall of the casing thereof, the second cutting member cutting the object in a manner so as to partially sever one portion of the object from another.

Preferably, the cutting device includes a coring blade for removing a core of the object, and the outer casing is generally in the form of an open ended cylinder, the central axis comprising the axis of the cylinder, and the coring blade is also of generally cylindrical form and coaxial with the outer casing, the coring blade having a sharpened upper edge. Preferably, the first cutting member comprises a pair of blades extending radially outwardly from the coring blade to the inner surface of the casing, one end of each of the pair of blades having its upper edge level with the upper edge of the coring blade, an other end of each of the pair of blades having its upper edge level with and contacting the upper edge of the casing, while the second cutting member comprises at least one blade extending radially outwardly from the coring blade, one end of said blade having an upper edge level with the upper edge Of the coring blade, the other end of said blade having an upper edge with extends downardly away from the upper edge of the outer casing, said blade having its other end a predetermined distance from the inner surface of the casing.

According to another aspect of the invention, there is provided a scooping device for use on a fruit having a generally spherical shape and having an Outer peel and an inner edible portion, the fruit having been approximately bisected, the scooping device comprising a generally hemispherical shaped scooping member having a dome or apex and a substantially circular edge, the edge forming a cutting blade; a shaft member having a longitudinal axis extending outwardly from a point on an outer surface of the scooping member near the edge thereof to facilitate rotation of the scoop in a direction normal to the longitudinal axis. Conveniently, the scooping device further comprises a base member of hemispherical shape, the base member being adapted to accommodate and hold a piece of fruit the inside of which is removed by the scooping member, and the base member has an inner surface and an outer surface, the inner surface having a diameter larger than the diameter of the scoop. The diameter of the inner surface of the base member exceeds the diameter of the scoop member by an amount which is slightly larger than the thickness of the outer peel of the fruit, and the base member has a plurality of projections thereon for engaging the peel of the fruit member to prevent slippage thereof while contained in the base member.

The present invention therefore preferably comprises a mechanism which mechanically cuts fruit into a number of segments, discarding the center core and the skin, while retaining the valuable edible part of the fruit, and segmenting it in a manner which is effective and labor efficient.

DETAILED DESCRIPTION OF THE PREFERRED EMBODIMENTS

Figure 1:
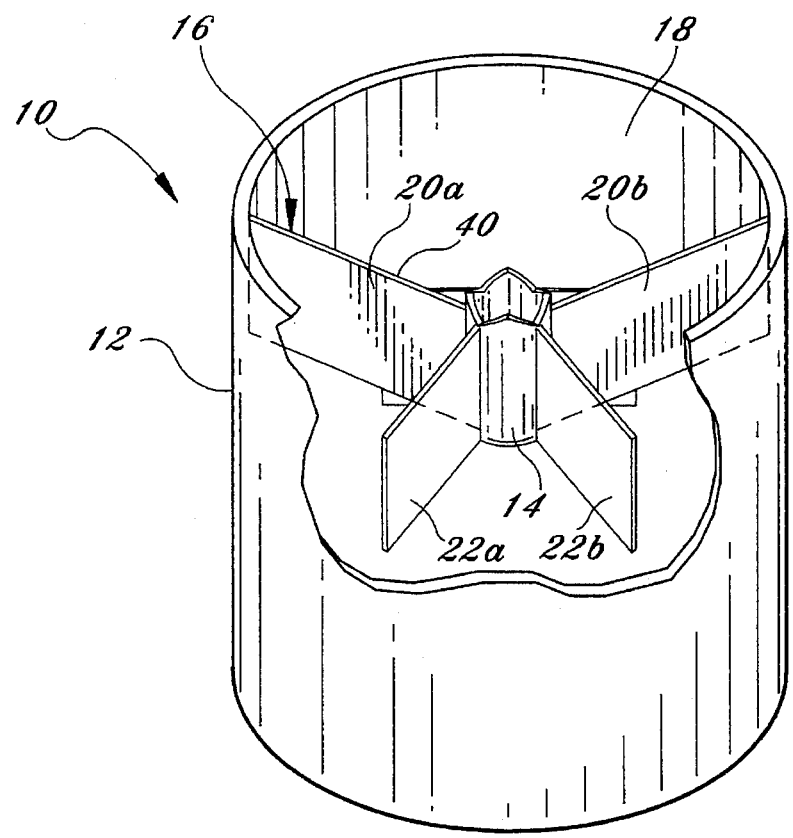
FIG. 1 is a perspective view, partially cut away, of a fruit cutter.
Figure 2:
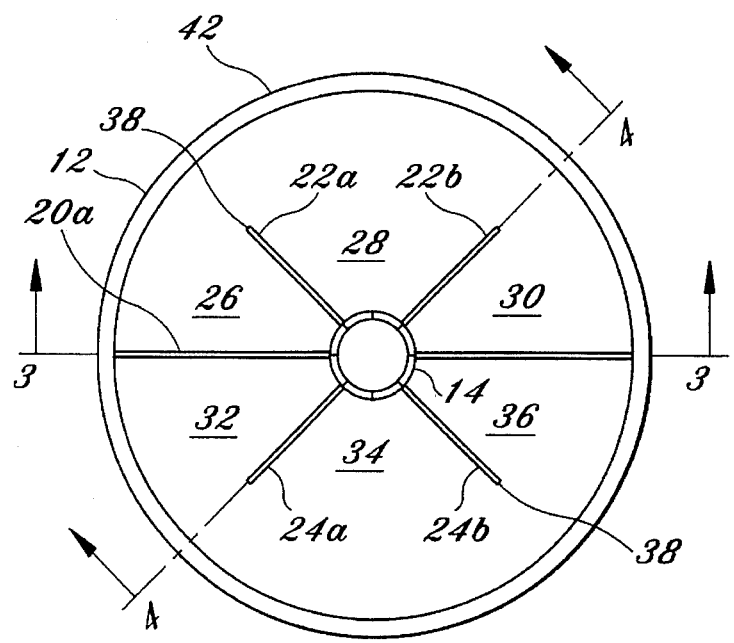
FIG. 2 is a plan view of the fruit cutter shown in FIG. 1.

With reference to the accompanying drawings, the fruit cutter and fruit scooper will now be described.

With reference to FIGS. 1 to 4, there is shown a fruit cutter 10, comprising a generally cylindrical outer casing 12, a generally cylindrical coring blade substantially coaxial with the casing, and a radial cutting blade assembly 16 in the annular space 18 defined between the outer casing 12 and the coring blade 14. The casing 12 may be comprised of any suitable material such as metal, aluminum or plastic. The radial cutting blades 16 comprise a pair of slicing blades 20a and 20b which are more or less diametrically opposed to each other on the coring blade 14. The cutting blade assembly 16 further comprises two pairs of scoring blades 22a, 22b, 24a, 24b, the scoring blades being approximately equi-spaced between the slicing blades 20 so as to divide each of the spaces between the slicing blades 20a and 20b into three substantially equal segment areas. Thus, segment area 26, 28 and 30 are defined by blades 20a, 22a, 22b and 20b, while segment areas 32, 34 and 36 are defined by blades 20a, 24a, 24b and 20b. It is to be noted that the slicing blades 20a and 20b extend from the coring blade to the perimeter of the outer casing 12, but scoring blades 22a, 22b, 24a and 24b extend radially outwardly from the coring blade into the annular space 18, but do not reach the outer casing 12. The distance between the remote end 38 of each scoring blade and the outer casing 12 is designed or calculated according to need, and the fruit being cut, as will be fully described hereunder.

Figure 3:
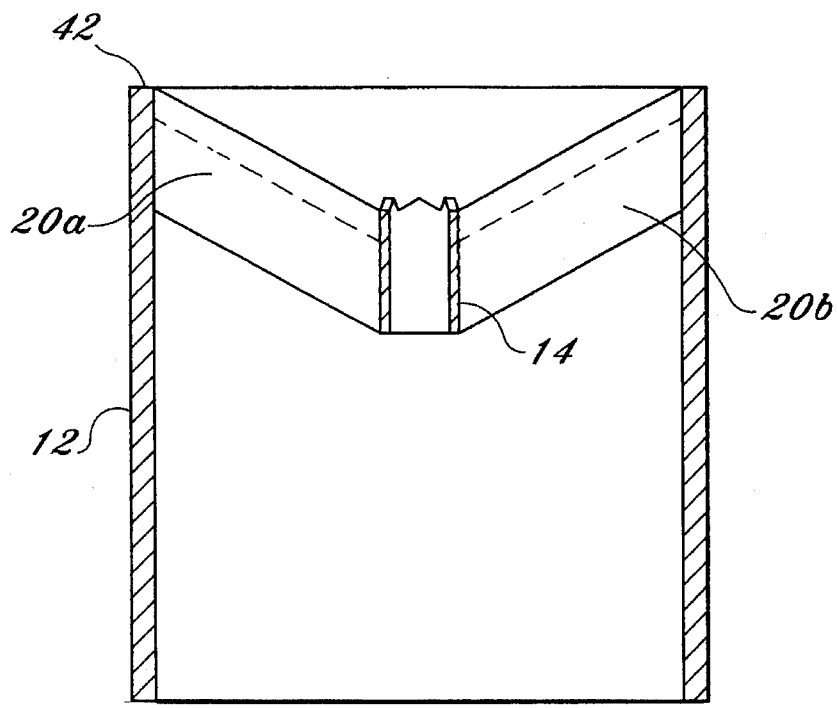
FIG. 3 is a section of the fruit cutter through line A—A of FIG. 2.
Figure 4:
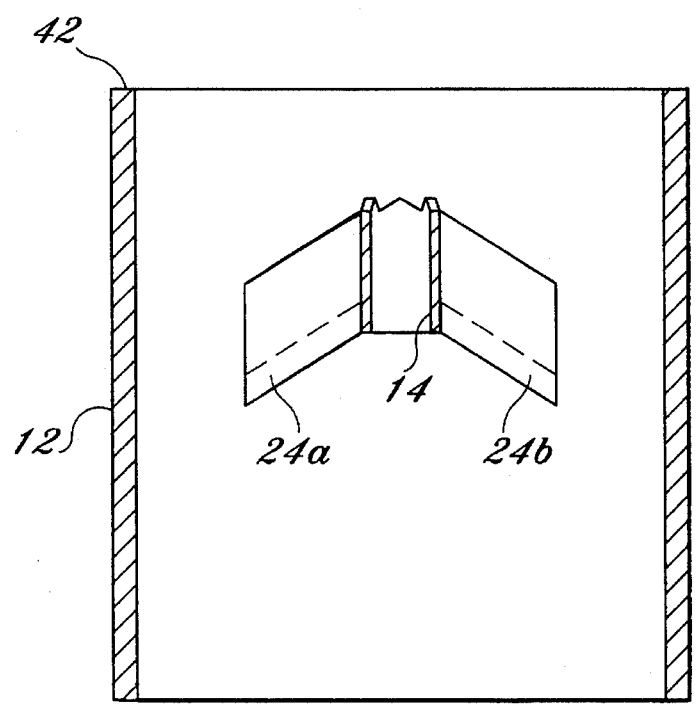
FIG. 4 is a section of the fruit cutter through line B—B of FIG. 2.

All of the blades in the fruit cutter 10, namely, coring blade 14, slicing blades 20a and 20b, and scoring blades 22a, 22b, 24a and 24b, have highly sharpened upper edges 40. Further, as best seen in FIGS. 1, 3 and 4, the upper edge of the coring blade 14 is below the upper edge 42 of the outer casing and has a scalloped or serrated surface. The sliding blades 20 in the cutting blade assembly 16 extend upwardly, namely, at an angle relative to the horizontal, while the scoring blades 22 and 24 extend downwardly at an angle relative to the horizontal. The slicing blades 20a and 20b in the present embodiment have the upper edge thereof flush with the upper edge 40 of the coring blade 14 and the upper edge 42 of the casing 12. The scoring blades 22a, 22b, 24a and 24b extend downwardly from the coring blade 14 at substantially the same but opposite angle as the slicing blades 20a and 20b, although, as already mentioned above, the remote ends 38 of the scoring blades do not reach the outer casing 12.

In use, the fruit cutter 10 may be used to cut various fruits, but this particular embodiment will be described with respect to a citrus fruit such as an orange, lemon or grapefruit. Reference is now made to FIGS. 5a to 5d, which show various diagrammatic illustrations of a citrus fruit before, during and after passing through the fruit cutter 10.

Figure 5A:
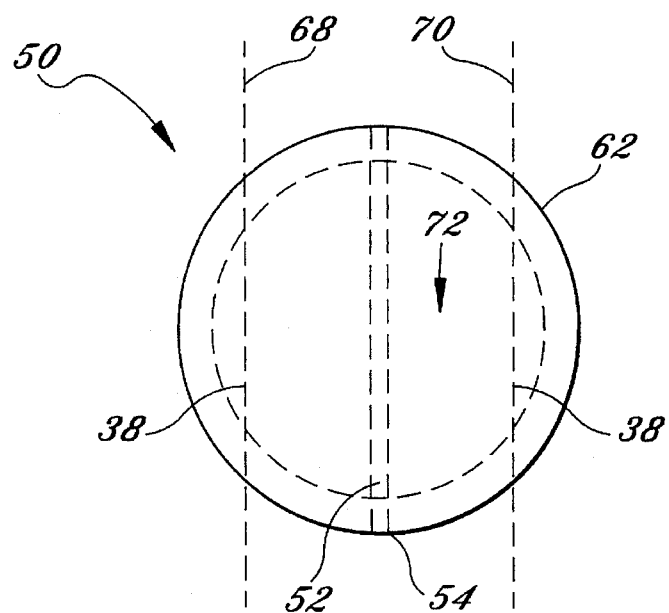
FIGS. 5a to 5e show a piece of fruit which has been cut by the cutter shown in FIGS. 1 to 3, FIG. 5a showing the fruit prior to cutting, FIG. 5b showing two halves of the fruit after passing through the fruit cutter, FIGS. 5c and 5d illustrating schematically in sideview and planview respectively the partial cuts made by the fruit cutter to each half of the fruit, and FIG. 5e being a schematic plan view of the cut fruit.
Figure 5B:
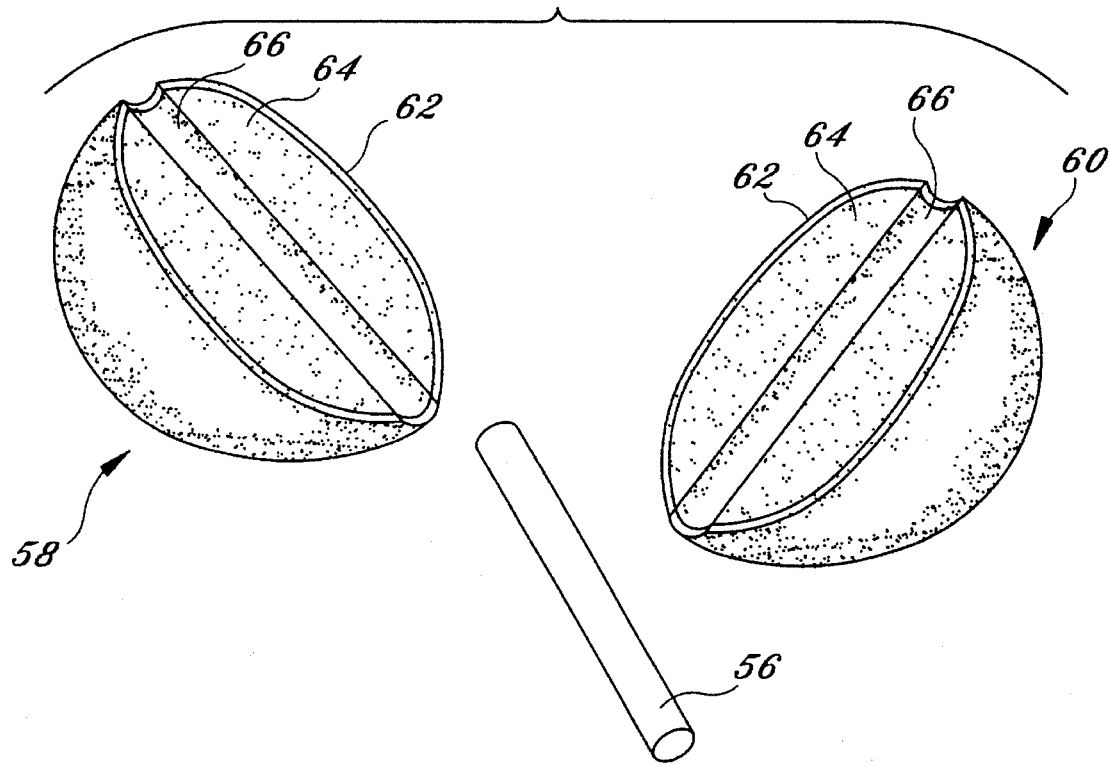

In FIG. 5a, there is shown a whole orange 50, with its core or axis 52 vertically aligned. The orange 50 is brought down on the fruit cutter 10 so that the base 54 of the core 52 is over the coring blade 14. Further downward pressure of the orange 50, either manually or automatically operated by a machine, causes the orange to be passed downwardly through the outer casing 12 of the fruit cutter 10, and over the radial cutting blade assembly 16. As the orange passes over the radial cutting blade assembly 16, the core 52 of the orange is separated from the remainder thereof by the coring blade 14, producing a disposable core 56 (as shown in FIG. 5b). This core 56 typically comprises stringy white matter of the orange, disfavored for eating purposes, and is therefore removed. The coring blade 14 may direct the disposable core 56 to a location where it can be automatically carried off without being manually separated from the remainder of the orange 50.

Downward movement of the orange 50 over the slicing blades 20a and 20b results in two orange halves 58 and 60. Each orange half will comprise the skin or outer peel 62, the flesh or eating portion 64, and a hollowed out area 66 corresponding to the disposable core 56 which has been removed by the coring blade 14.

The effect of the scoring blades 22a and 22b, and 24a and 24b, will now be described. As the orange passes through the casing 12 of the food cutter 10, it is subjected to the cutting action of the scoring blades. The scoring blades extend outwardly from the coring blade 14 to a distance which slices a part of the orange, extending from the radial inner portion outwardly therefrom, but does not sever completely one portion of the orange from another. The action of the scoring blades 22 and 24 can be appreciated with particular reference to FIG. 5a of the drawings. In FIG. 5a, the staggered vertical lines 68 and 70 indicate the outermost extreme or remote end 38 of the scoring blades 22 and 24. Thus, as the orange moves downwardly, as shown by arrow 72 in FIG. 5a; the scoring blades 22 and 24 will cut the orange in all areas between the staggered vertical lines 68 and 70, leaving that part of the orange outside of these boundaries intact. If reference is made to FIG. 5e of the drawings, there is shown a schematic or diagrammatical plan view of the orange after it has passed over the radial cutting blade assembly 16 through the outer casing 12. Superimposed upon the cut orange is a plan view of the fruit cutter 10 in ghost lines. It is noted that slicing blades 20 cut the orange completely in half, while coring blade 14 removes a hollowed out area 66 corresponding to the core 52 of the orange. The scoring blades 22 and. 24 result in cuts 74a and 74b in orange half 58 and 76a and 76b in orange half 60. The cuts 74 and 76 extend through the flesh or eating portion 64 of the orange and reach approximately the inside surface 78 of the skin 62. Thus, the total effect of the fruit cutter 10 and the radial cutting blade assembly 16 is to:

1. slice the orange in half;

2. remove the center and usually inedible core 56 for disposition;

3. partially segment each half of the orange into approximately three equal sections by cutting only a part of the skin 62, and most of the fruit flesh 64.

The only portion of each half of the orange not cut by the scoring blades 22 and 24 is the horizontal extremity or equator of the orange, namely, that portion of the skin falling outside of the area defined by staggered vertical lines 68 and 70 in FIG. 5a.

Figure 5C:
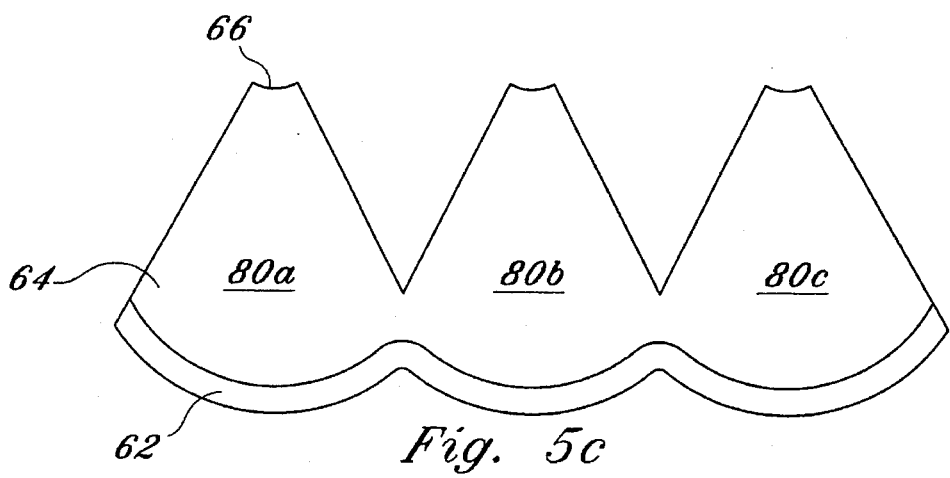
Figure 5E:
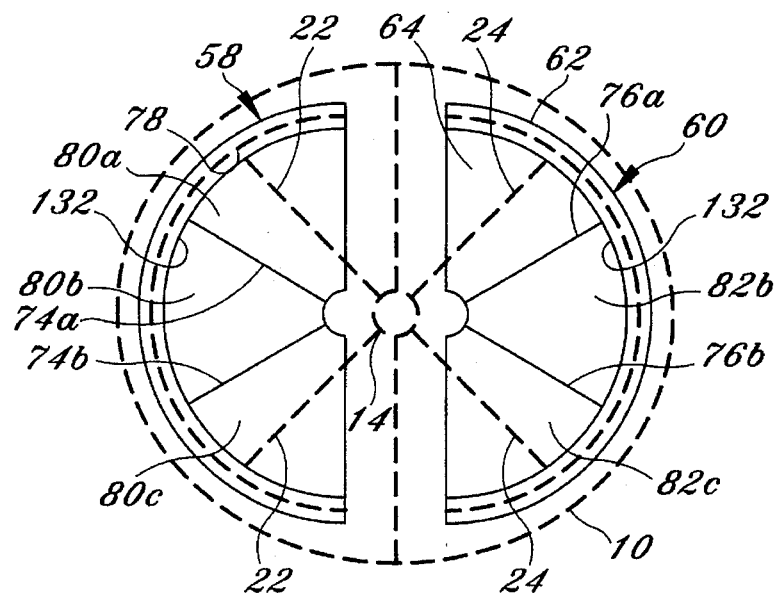
Figure 5D:
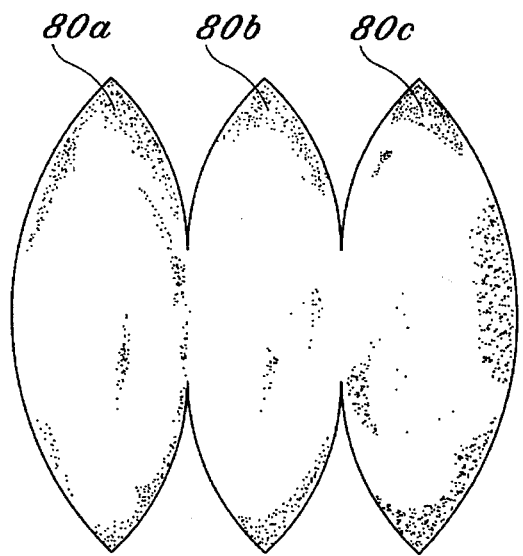

Having passed through the fruit cutter 10, half orange 58 comprises three segmented fruit portions 80a, 80b and 80c, and orange half 60 comprises three segmented fruit portions 82a, 82b and 82c. With reference to FIGS. 5c and 5d, half orange 58 is shown in side and plan view wherein the segmented fruit portions 80a, 80b and 80c have been parted from each other, showing the effects of the scoring blades 24 extending through the flesh of the orange, but generally leaving the skin 62 intact.

The scoring blades 22 and 24 are dimensioned so that the distance between end 38 and the casing 12 is equal to or slightly greater than the thickness of the skin. Thus, depending upon the fruit being cut, the scoring blades will have varying lengths according to need.

It is to be noted that the fruit cutter 10 described above is one particular embodiment only, and that any arrangement of radial cutting blade assemblies 16 may be used. Thus, for example, there may be only one scoring blade in each half only, thereby dividing an orange into two segmented fruit portions only on the other hand, three or more scoring blades may be used thereby providing four or more segmented fruit portions. Clearly, the number of scoring blades chosen for any one embodiment will depend upon the size of the segment required, the size of the fruit and such other pertinent factors as may be appropriate.

In addition, there may be more than two slicing blades, thereby completely severing the fruit into more than two portions. Again, the number of slicing blades will depend upon the size of the fruit, the number of segments required, and the object of producing a fruit portion which can be further processed in an expedient and efficient manner.

It may well be that certain fruits do not require core removal, in which case, the coring blade 14 may be omitted.

Figure 6:
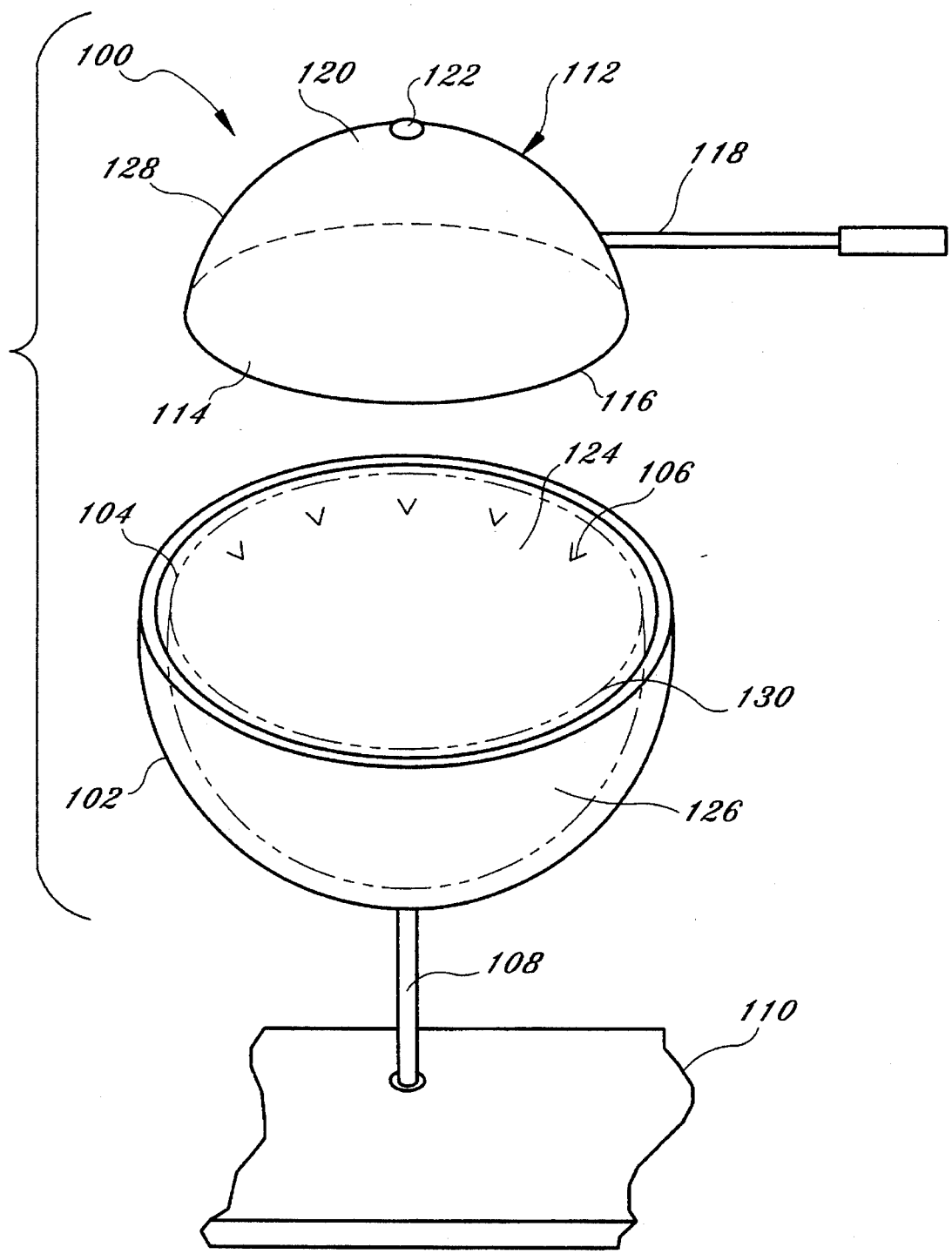
FIG. 6 is a perspective view of a fruit scooping device in accordance with another aspect of the invention.
Figure 7:
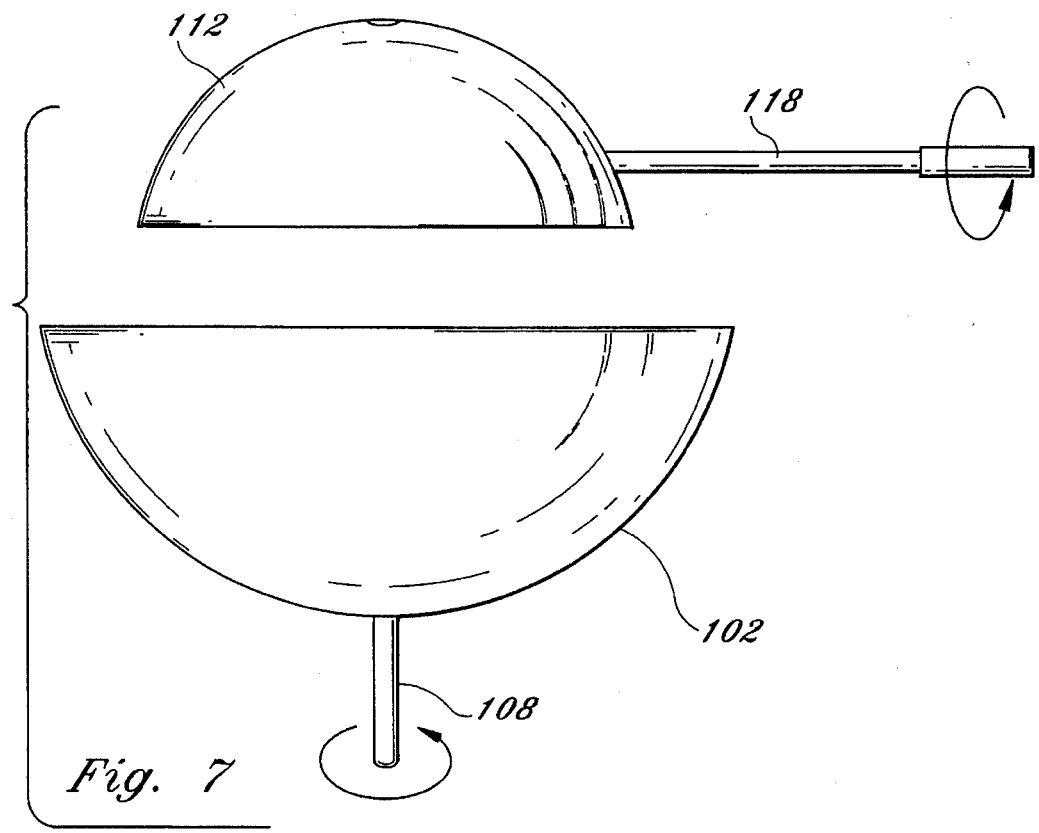
FIG. 7 is a sideview of the fruit scooping device shown in FIG. 6.

Reference is now made to FIGS. 6 and 7 of the drawings, which show a fruit scooping device 100. The fruit scooping device 100 comprises a fruit cradle or holder 102, of approximately hemispherical shape. The internal surface 104 of the cradle 102 has a series of projections 106 thereon designed to engage the skin of a fruit, and generally prevent slippage of the fruit when in the cradle 102. The cradle 102 is mounted on a shaft 108, in turn generally mounted on a base 110. The shaft 108 is rotatable about the axis thereof so that the cradle 102 is capable of rotating.

The fruit scooping device 100 further comprises a scoop 112 of generally hemispherical shape, and of smaller dimensions than the fruit cradle 102. Relative dimensions will be discussed hereunder with respect to the operation of the scooping device 100. The lower edge 114 of the scoop 112 is sharpened and operates as a circular blade 116. The scoop 112 has connected thereto a shaft 118 which is pivotable about its axis. The apex 120 of the scooping device 118 has an aperture 122.

In operation, the fruit scooping device 100 is used to remove the edible portions of a piece of fruit, preferably fruit having an inedible outer skin. The fruit scooping device 100 works particularly well with citrus fruits, such as oranges, lemons and grapefruits.

A whole fruit, such as an orange, is sliced in half, and one half is placed in the fruit cradle 102 with the cut or open portion of the orange exposed. The internal surface 104 of the cradle 102 will therefore be adjacent the skin, and the projections of 106 arranged on the internal surface will contact and grip the fruit to prevent movement of the fruit in the cradle. While the fruit, as described above, is located in the cradle 102, the cradle 102 will pivot about its axis by means of a driven shaft 108. In this condition, the scoop 112 is lowered, either manually or automatically, until the circular blade 116 contacts the upper surface 124 of the fruit 126. The diameter of the scoop 112 at its outer circumference 128 is less than the internal surface circumference 104 of the cradle 102. The distance from the internal surface 104 of cradle 104 to the outer circumference 128 of scoop 112 will be just slightly greater than the thickness of the peel 130 of the fruit.

As the circular blade 116 contacts the upper surface 124 of the fruit 126, the blade 116 penetrates the fruit, and this penetration is facilitated by the rotation of the fruit in the cradle. After the fruit has been contacted, the scoop 112 is no longer lowered, but is pivoted about the axis of the shaft 118. Pivoting of the shaft 118 causes the entire scoop 112 to rotate, and the sharp circular blade 116, coupled with the rotating motion of the fruit by the cradle 102, removes a hemispherical section of the edible part of the fruit from the peel. The scoop rotates through an angle of about 180°, and is thereafter moved upwardly with the cored out edible portion of the fruit 126. All that remains in the cradle 102 after this action is the peel 130 which may be ejected in any suitable manner so that the cradle is once more ready to receive a further fruit half to be cored.

Upon removal of the scoop 112 to an uppermost position, the shaft 118 and scoop 112 are both rotated through 180°, and the piece of fruit extracted falls from the scoop. The aperture 122 at the apex 120 of the scoop facilitates removal of the cut fruit by minimizing an air vacuum between the inner surface of the scoop 112 and the surface of the cut fruit.

It is to be appreciated that the scoop 112 can be raised, lowered and turned manually. When operated manually, the shaft 118 may be adapted for comfortable holding, as is well known.

The scoop 112 can be used, either manually or automatically, without a specific fruit cradle or holder 102 being provided. Thus, the scoop 112 may remove the edible portion of a fruit which is being cradled by a person's hand. Preferably, the holder of the fruit would rotate it in such a way so that the movement of the scoop 112 and the fruit 126 permits the circular blade 116 to easily penetrate the upper surface 124 of the fruit, and remove the edible portion therefrom.

The fruit scooping device 100 may also be used in conjunction with the fruit cutter 10 described in FIGS. 1 to 5. Thus, an orange half 58 or 60 may be inserted in the fruit cradle 102, with the peel held against the internal surface 104 of the cradle by the projections 106. In a manner identical to that already described above, the scoop 112 may be used to remove the center or fruit portion of the orange half 58 or 60. Where the orange half 58 has been cut in accordance with the process described with respect to the fruit cutter 10, that portion of the fruit remaining in the scoop 112 after the action thereof will be in three segments. With reference to FIG. 5e, the action of the circular blade 116 of the scoop 112 would move along the cutting line 132, the cutting line 132 intersecting the cuts 74a and 74b of the orange half 58. Since the segments radially outward of the cut 74a and 74b are connected to each other on the peel 62, but not connected to each other radially inwardly of the cutting line 132, the segmented fruit portions 80a, 80b and 80c will be separate from each other after the action of the scoop 112, as described above. Therefore, as soon as the cut fruit is expelled or otherwise removed from the inside of the scoop 112, it will comprise three separate pieces, each piece being a segment of desired shape and size for use in particular dishes required by the food industry.

The fruit cutter 10 and fruit scooping device 100 can be integrated as one of several such devices in a fruit cutting system and fruit scooping system respectively. Furthermore, the fruit cutting system and fruit scooping system may also be integrated, either automatically or in a manual mode, for the complete treatment of a fruit, such as an orange, which is cut, peeled and segmented most effectively with a minimum number of steps. The fruit cutting system and fruit scooping system is described below with reference to FIGS. 8 and 9 respectively.

Figure 8:
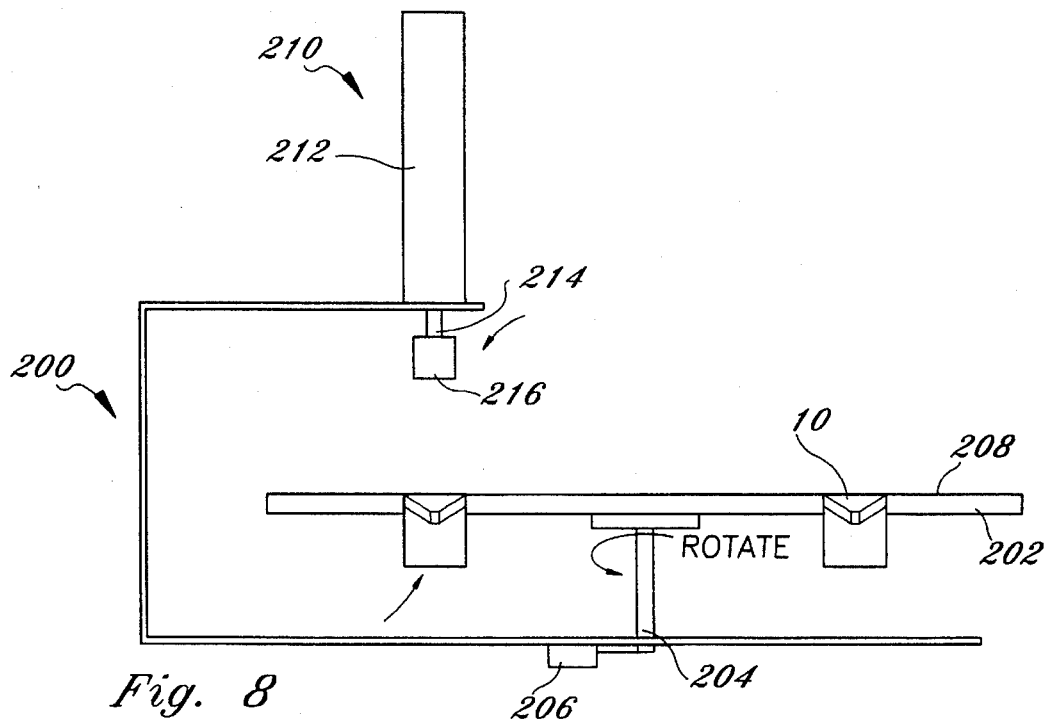
FIG. 8 is a sideview of a fruit cutting system of the invention utilizing the fruit cutter illustrated in FIG. 1 to 4.

In FIG. 8, there is shown a fruit cutting system 200. The system comprises a rotating turntable 202 mounted on a shaft 204 driven by a motor 206 with index control, to be described in further detail below. Six equispaced fruit cutters 10 are mounted in the rotating turntable 202. Each fruit cutter 10 is of substantially the same structure and configuration as described above with reference to FIGS. 1 to 5, with the upper edge 42 of each cutter 10 being flush with the upper surface 208 of the turntable 202.

Associated with the turntable 202 is a punching device 210 comprising a pneumatic cylinder 212 having a shaft 214, and a push block 216 at one end of the shaft 214. The shaft 214 and push block 216 may be raised or lowered, according to well known and conventional methods. In use, an orange, or other fruit to be cut, is placed in a fruit cutter 10, in a manner described above, and generally with the axis or core of the fruit being parallel to the vertical axis. The turntable 202 is rotated until the fruit cutter 10 is located immediately below the punching device 210, whereupon the motor 206 is indexed or programmed to stop. At the moment of stoppage, the punching device 210 is pneumatically activated, causing the shaft 214 and push block 216 to move downwardly towards the fruit. The push block 216 contacts the fruit and forces it through the cutting blade assembly 16. The two halves, each of which is partially segmented, are removed, either manually or automatically for further processing. As soon as the fruit has been pushed through the cutting blade assembly 16, the motor 206 is once more activated and the turntable 202 rotates until the next sequential fruit cutter 10, loaded with fruit, passes below the push block 216. The process described above is repeated. The fruit cutters 10 may be manually loaded by a person sitting at a different location to the position of the fruit cutter 10 subjected to the push block 216.

In addition to the two partially segmented halves of the fruit produced by the fruit cutter 10, if a coring blade 14 forms part of the fruit cutter 10, the non-edible disposable core will also be ejected from the fruit cutter 10 and disposed of.

The turntable 202 may have any number of fruit cutters 10 located therein, each fruit cutter having a cutting blade assembly suitable for the fruit being cut. In addition, the fruit cutting system 200 may comprise several punching devices 210 appropriately spaced from each other so that, when the motor stops, a cutting device 10 will be located below the push block for cutting of fruit.

The fruit is held in the fruit cutter 10 by the blades which serve as a holder for the cutting process. Since the blades are so sharp, movement of the fruit prior to cutting, when properly located on the cutting blade assembly will be substantially reduced or nonexistent.

Figure 9A:
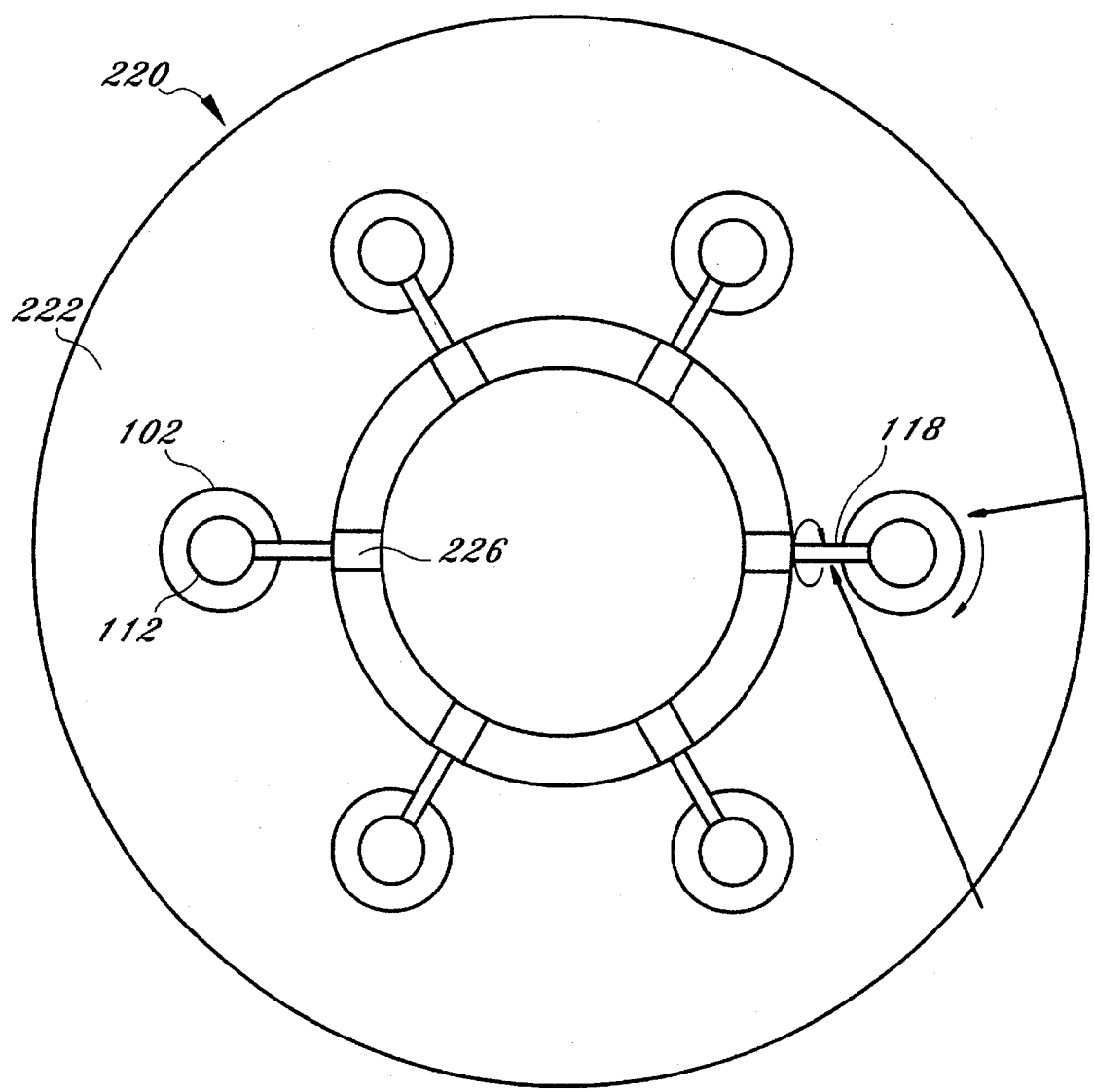
FIG. 9 (a) is a plan view of a fruit scooping system utilizing the fruit scooping device illustrated in FIGS. 6 and 7.
FIG. 9(b) is a side view of the fruit holder with fruit half.
Figure 9B:
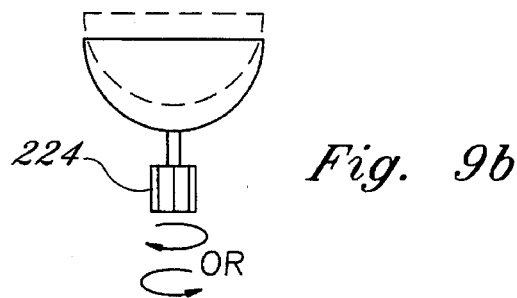

FIG. 9 shows a fruit scooping system 220 comprising a rotating turntable 222 driven by a shaft motor in a similar manner to that described with respect to the turntable 202 of the fruit cutting system 200. Therefore, details will not be repeated. The turntable 222 has located therein six equispaced fruit cradles or holders 202. Each fruit holder is connected to a shaft 108, shown best in FIG. 9b, terminating in a spur gear 224 which is driven by a motor in conventional manner. The spur gear rotates the shaft 108 about its axis, which causes rotation of the fruit cradle 102 in a manner described above with respect to FIGS. 6 and 7.

A series of six equispaced scoops 112 are provided above the fruit cradles 102, such that when the turntable 222 is rotated into a certain position, all of the scoops 112 will be directly above the six fruit cradles 102, and be in axial alignment therewith. Each scoop 112 has attached thereto a shaft 118 connected to a spur gear 226 such that the scoop 12 can be rotated about an axis coincident with the axis of the shaft 118.

In use, each fruit cradle 102 is loaded with half of a fruit, as already described above with respect to FIGS. 6 and 7. Loading may take place with the scoops 112 in a raised position so that access to the fruit holder is provided. Alternatively, or in addition, the turntable 222 may be rotated so that the holders 102 are not coincident or in axial alignment with the scoops 112, and the fruit loaded therein. Thereafter, the turntable is once more rotated, either manually or automatically by a machine programmed to move the turntable to axially align the holder 102 and the scoop 112. The six scoops 112 are thereafter lowered and each pivoting scoop, coupled with the rotation of the holder, has the effect of removing the edible portion of the fruit. After removal, the turntable may be rotated and the contents of the scoop deposited in a collection container (not shown) in any suitable manner.

It is to be noted that the fruit cutting system 200 and the fruit scooping system 220 have been illustrated independently. However, by appropriate delivery systems, the fruit which has been cut by the fruit cutting system 200 may be delivered to the fruit scooping system 220 and appropriately loaded in the fruit holders 102 so that the entire system of cutting, scooping and segmenting a piece of fruit is automated.

The invention is not limited to the precise details of construction described above. For example, the fruit cutting system and fruit scooping system may comprise any suitable means which effectively causes fruit to be loaded in a fruit cutter 10 in an automated fashion for cutting. Thus, instead of the table 202 rotating, a series of fruit cutters 10 may be provided either in a circle or linearly, and a moving pushing device 210 located serially over the fruit cutters 10 for cutting the fruit. A similar situation may prevail with respect to the fruit scooping system 220. With respect to the fruit scooping system 220, more holders 102 may be provided than scoops 112, the scoops operating at a faster rate than the loading process, so that fewer scoops 112 are necessary.

I claim:

1. A method of peeling and segmenting fruit having an interior portion and a peel therearound, the method comprising the steps of:

forcing the fruit through a cutting assembly so as to produce at least two separated portions of said fruit which are completely severed from each other, each separated portion also being partially severed through the interior portion;

placing said separated portions of the fruit in contact with a scooping device; and rotating the scooping device such that the interior portion of said fruit is scooped out and separated from the peel, whereby the portions scooped out thereafter comprise two or more segments each substantially separate from each other.

2. A method as claimed in claim 1 wherein the separated portion of the fruit is partially severed along a substantially radial line extending from a core of the fruit to an outer periphery thereof.

3. A method as claimed in claim 2 wherein the separated portion of the fruit is partially severed along two or more radially lines extending from a core of the fruit to an outer periphery thereof.

* * * * *